United States Patent [19]

Lanerie

[11] Patent Number: 4,540,485
[45] Date of Patent: Sep. 10, 1985

[54] VIBRATORY SCREEN SEPARATOR

[76] Inventor: John Lanerie, P.O. Box 30198, 209 Guilbeau Rd., Lafayette, La. 70503

[21] Appl. No.: 232,407

[22] Filed: Feb. 6, 1981

[51] Int. Cl.³ .............................. B07B 1/38; B07B 1/54
[52] U.S. Cl. .................................... 209/323; 209/332; 209/382; 209/403; 269/91; 269/207
[58] Field of Search ............... 209/323, 381, 382, 385, 209/387, 332, 366, 366.5, 319, 403, 367, 326; 210/413, 353, 332; 269/91, 93, 99, 208, 209, 207, 213; 101/128.1, 127.1

[56] References Cited

U.S. PATENT DOCUMENTS

| Re. 26,736 | 12/1969 | Swallow | 209/382 X |
|---|---|---|---|
| 726,172 | 4/1903 | Kovab | 209/315 |
| 946,548 | 1/1910 | Johnston | 209/323 |
| 2,077,678 | 4/1937 | DeLamater | 209/403 X |
| 2,114,406 | 4/1938 | Simpson | 209/403 |
| 2,232,780 | 10/1943 | Cecka | 209/323 |
| 2,269,289 | 1/1942 | Schifflin | 209/323 |
| 2,696,302 | 12/1954 | Miller | 209/332 |
| 2,888,052 | 5/1959 | Reason | 269/91 |
| 2,949,934 | 8/1960 | Schrenk | 261/DIG. 72 |
| 3,011,639 | 12/1961 | Holman | 209/332 |
| 3,047,151 | 7/1962 | Hurst | 209/366.5 |
| 3,160,584 | 12/1964 | Hunter | 209/366.5 |
| 3,470,754 | 10/1969 | Ferrara | 209/367 |
| 3,508,649 | 8/1967 | Kahane | 209/385 X |
| 3,704,782 | 12/1972 | Hahn | 209/326 |
| 3,794,165 | 2/1974 | Riesbeck | 209/332 X |
| 4,152,253 | 5/1979 | Summers | 209/323 |

FOREIGN PATENT DOCUMENTS

| 148835 | 6/1951 | Australia | 261/DIG. 72 |
|---|---|---|---|
| 404078 | 5/1943 | Italy | 269/91 |
| 139873 | 10/1960 | U.S.S.R. | 209/366 |

Primary Examiner—Frank W. Lutter
Assistant Examiner—Wm. Bond
Attorney, Agent, or Firm—Mason, Fenwick & Lawrence

[57] ABSTRACT

A vibratory screen separator has cylindrical cleaner elements engaging the lower surface of a horizontal screen with the cleaner elements having a center of gravity offset from their longitudinal axis so that vibration imparted to a supporting perforated surface effects enhanced movement of the cleaner elements. Screen clamp means are pivotally mounted to swing to an external position with respect to a floating tub assembly in which the screen is positioned to permit removal of the screen and a subsequent removal for repair or replacement of a unitary vibrator unit mounted in a housing extending axially below the screen.

18 Claims, 9 Drawing Figures

VIBRATORY SCREEN SEPARATOR

BACKGROUND OF THE INVENTION

The present invention is in the field of vibratory screen separator devices such as are used for a wide variety of purposes such as the separation of solid material of different sizes carried in a liquid such as drilling mud. More specifically, the present invention in its preferred form comprises a vibratory screen and associated cleaning assembly which is employed for separating the cuttings from drilling mud components.

The use of vibratory screen solid/liquid separating devices is well-known as shown in prior U.S. Pat. Nos. 3,960,731; 3,899,414; 3,841,482Re. 26,736; 3,863,765, and 4,152,253. A number of the prior art devices have recognized the need for providing screen cleaning means to prevent clogging of the screen so as to maintain maximum flow through the screen on a continuous basis. However, none of the prior known systems has been totally satisfactory. One approach is that illustrated in U.S. Pat. No. 3,508,649, in which tubular anti-binding rings are supported in contact with the upper surface of a separator screen. Unfortunately, screen cleaning elements of this type do not always move effectively over the entire surface of the screen due to the dynamics of the vibratory motion supplied to such elements.

Another problem with the prior known vibratory screen-type separating devices is that they are subject to mechanical breakdown due to mechanical failure fo the vibratory unit. It is consequently frequently necessary to remove and repair or replace the vibratory unit with such repairs necessitating that the unit be out of service for a substantial time period. The down-time required for repairs is substantial since it is frequently necessary to substantially disassemble the unit in order to remove the vibratory means.

Therefore, substantial problems remain in connection with the use of vibratory screen-type separator devices and it is the primary object of this invention to provide solutions to such problems.

A more specific object of the invention is the provision of a new and improved vibratory screen-type separator device incorporating improved screen cleaning components.

Yet another object of the present invention is the provision of new and improved vibratory screen-type cleaning devices in which the vibratory means per se can easily and quickly be removed for repair or maintenance purposes.

SUMMARY OF THE INVENTION

The present invention achieves the foregoing objects through the provision of a new and improved vibratory screen apparatus in which a floating tub assembly is provided with a horizontal screen in its upper portion with unique clamp members for holding the screen in position but being easily movable to a remote position permitting removal of the screen from the tub assembly. A perforated plate is provided below the screen means and supports a large number of tubular screen cleaning elements which have upper ends engageable with the lower face of the screen. Each of the tubular screen cleaning elements is of generally cylindrical configuration but is provided with a slot in one side which creates an unbalance due to the fact that the center of gravity of the device is offset with respect to its geometric axis. It has been found that this offset positioning of the center of gravity results in an enhanced and improved movement of the cleaning elements when the entire assembly is vibrated by the vibratory means.

The vibratory means includes a bearing housing which can be easily removed following removal of the screen by a simple upward lifting movement so as to permit removal of the vibratory drive means as a unit for replacement in a matter of minutes. Consequently, the down-time of the apparatus is substantially reduced as compared to prior known devices in this field.

A better understanding of the preferred embodiment will be achieved when the following detailed description is considered in conjunction with the appended drawings in which like reference numerals are used for the same parts as shown in the different figures.

DESCRIPTION OF THE PREFERRED EMBODIMENT

Figure 1:
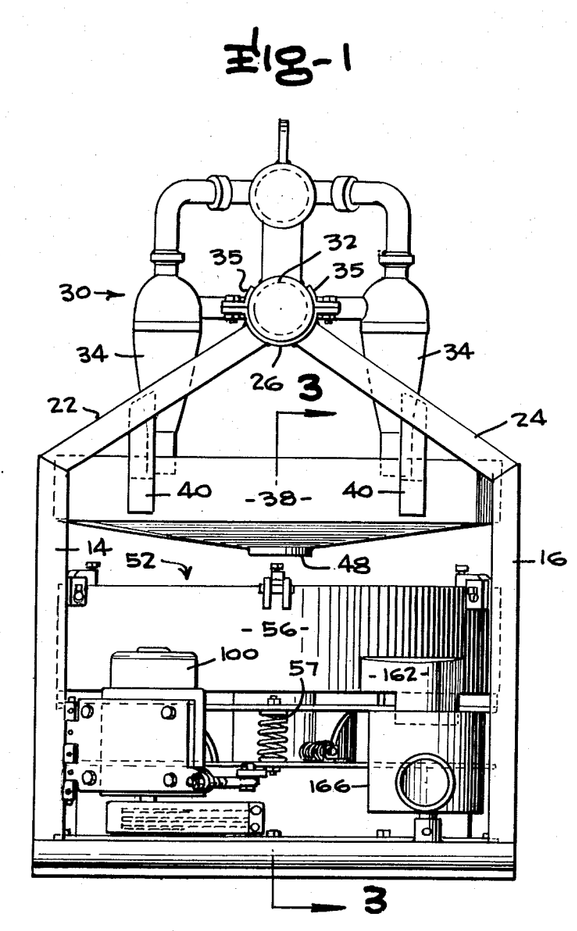
FIG. 1 is a front elevation view of the preferred embodiment of the invention.
Figure 2:
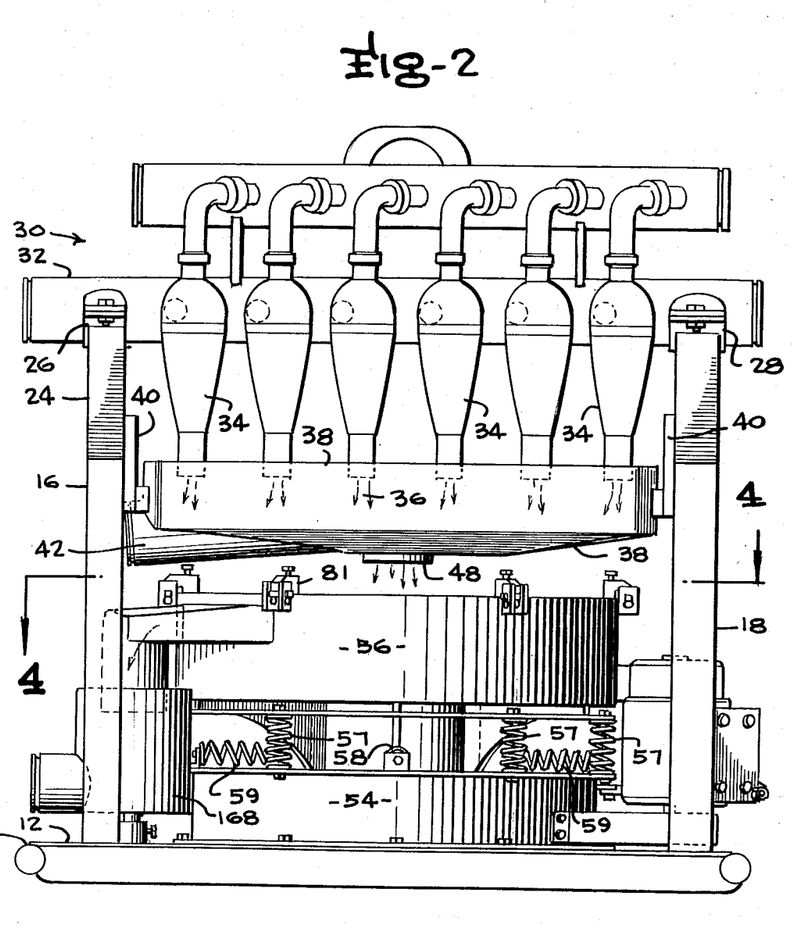
FIG. 2 is a side elevation view thereof.

Attention is initially invited to FIGS. 1 through 4 which illustrate the main components of the preferred embodiment which is used for separating drilling mud components and includes a frame consisting of a sled-like bottom platform 10 including a floor plate 12 and four vertical corner post members 14, 16, 18 and 20. Additionally, the frame includes canted elements 22 and 24 respectively extending outwardly from the upper ends of corner post members 14 and 16 and welded at their upper ends to a semi-cylindrical saddle plate 26. A similar saddle plate 28 is supported by canted frame elements extending outwardly from the corner posts 18 and 20. Saddle plate members 26 and 28 provide support for a conventional hydrocyclone assembly 30 with the drilling mud inlet manifold 32 of the hydrocyclone assembly resting on the saddle plate and being held in position by clamps 35 as best shown in FIG. 1.

Individual cyclonic separators 34 of assembly 30 operate in a well-known manner for discharging a mixture of mud and cuttings 36 from their lower ends into a receiving pan 38. Receiving pan 38 is removably supported on the framework by a downwardly extending carrier brackets 40 connected at their upper ends to the canted frame members 22,24 etc. Receiving pan 38 includes a side discharge conduit 42 from which the discharge from the cyclone separators 34 can be directly discharged for recirculation operation to a return line 44 connected to the suction tank of the drilling installation. A removable closure plug 46 permits the side discharge conduit to be closed as desired and a central discharge aperture 48 is provided in the center of pan 38 for permitting the discharge of the effluent from the cyclone separators 34 downwardly onto a horizontally extending screen 50 of a floating tub assembly generally designated 52. A removable plug 49 permits the central discharge aperture 48 to be closed as desired.

Figure 3:
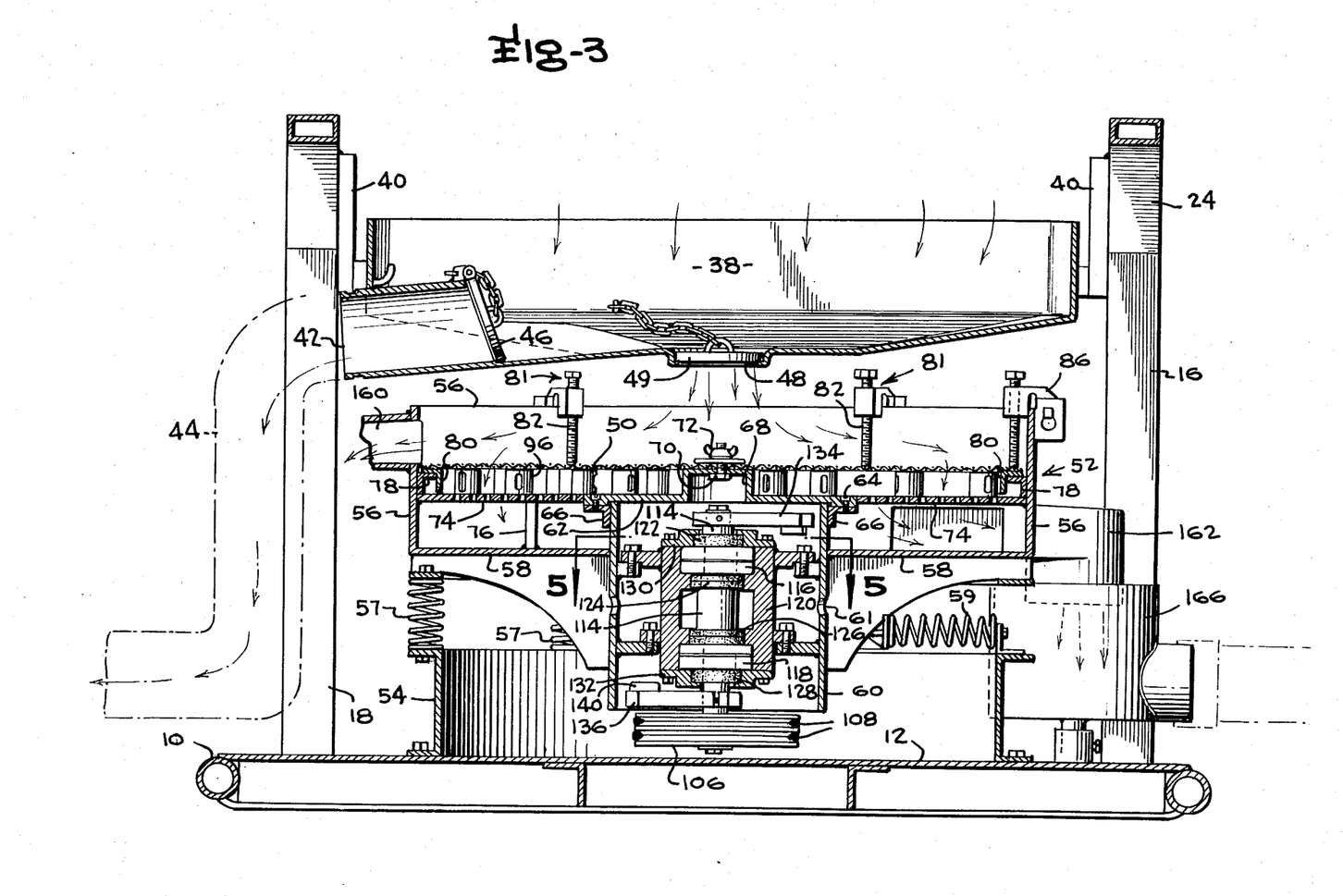
FIG. 3 is a sectional view taken along lines 3—3 of FIG. 1.

Floating tub assembly 52 is supported by a fixedly positioned cyclindrical pedestal 54 on the upper surface of floor plate 12 as best shown in FIG. 3 with the floating tub assembly being supported and restrained by a plurality of vertically extending coil springs 57 and horizontal coil springs 59 positioned about the periphery of pedestal 54. The floating tub assembly comprises a tub member per se consisting of a cylindrical sidewall 56, an annular floor panel 58 and a central cylindrical housing 60 which extends both above and below the annular floor panel 58. The central cylindrical housing 60 has central air inlets 61 and has its upper end covered by a cap plate 62 which is held in position by machine bolts or screws 64 threaded into an angle flange 66 welded to the side of the cylindrical housing 60. Cap plate 62 includes an upwardly extending protrusion 68 having an upper portion through which a screen retainer bolt 70 extends. Screen retainer bolt 70 extends outwardly through screen 50 with a thumb nut and washer assembly 72 being positioned on the bolt as shown in FIG. 3 for holding the central portion of the screen in clamped fixed position. An annular perforated plate 74 having flow-through apertures 75 is welded to the inner surface of cylindrical sidewall 56 and has an inner edge surface 77 (FIG. 4) closely surrounding the outer periphery of the cap plate 62 with which it is coplanar. A plurality of intermediate brace members as exemplified by element 76 can be provided to extend outwardly from the annular floor panel 58 to the annular perforated plate 74 for additional support thereof as shown in FIG. 3. A radial flange 78 extends inwardly from the inner surface of cylindrical sidewall 56 and provides support for a circular angle frame 80 to which the outer periphery of screen 50 is attached as best shown in FIG. 8.

Figure 8:
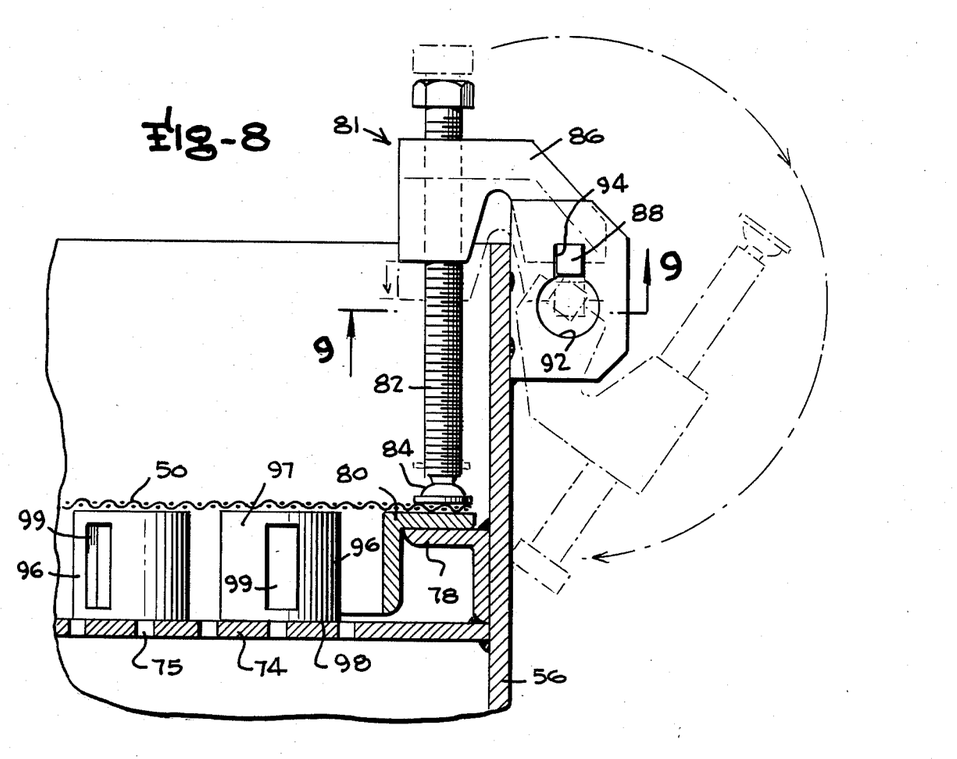
FIG. 8 is an enlarged portion of FIG. 3 illustrating novel screen clamp means.
Figure 9:
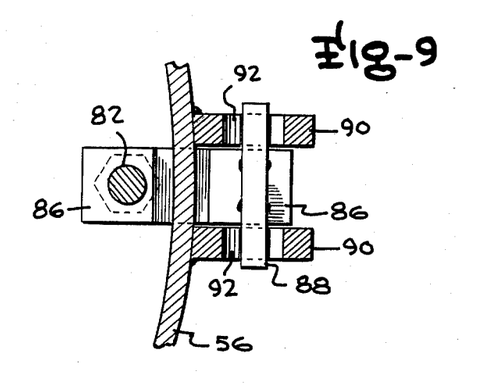
FIG. 9 is a sectional view taken along lines 9—9 of FIG. 8.

Unique clamping members 81 which are best illustrated in FIGS. 8 and 9 serve to clamp the screen and frame assembly 50,80 in position as shown in FIG. 8. Each of the clamp members comprises a threaded rod 82 on the lower end of which a swivel-foot 84 of the type frequently employed on C-clamps is mounted to engage the upper surface of the screen 50 as shown in FIG. 8. Threaded rod 82 is threadably mounted in a swing-arm 86 which has a rod 88 of square cross-section welded to one end positioned externally of the cylindrical sidewall 56. A pair of spaced parallel brackets 90 are welded to the outer surface of cylindrical sidewall 56 with the brackets having aligned identical openings defined by a circular lower portion 92 and a square upper portion 94 with the openings receiving the outer ends of the square rod 88 as best shown in FIG. 9. It is essential that the clamp members be able to move between the solid line clamping position and the phantom line external position with respect to cylindrical sidewall 56 so as to permit removal of the screen and frame assembly 50,80 when the clamping means is in the external position. This unique feature is enabled by virtue of the fact that the rotation of the threaded rod 82 to bring the swivel-foot 84 into clamping contact with the screen serves to lift the swing-arm 86 outwardly so that the square rod 88 is received in the square upper portion 94 of the slot of each of bracket members 90 so as to provide a rigid non-moving positioning of the swing-arm so that it is incapable of movement to its outer phantom line position. However, rotation of the rod 82 to cause it to move upwardly with respect to the swing-arm 86 permits the swing-arm to move downwardly so that the square rod 88 moves into the lower circular portion 92 of the apertures in brackets 90 to permit the subsequent pivotal movement of the swing-arm to its outer phantom line position of FIG. 8. Thus, the unique construction of the clamp permits it to be completely removed from within the interior of the cylindrical sidewall 56 so as to make the removal of the screen and frame assembly 50,80 a simple matter after the threaded nut and washer assembly 72 is removed from bolt 70 in the center of the screen.

A plurality of tubular generally cylindrical screen cleaning elements 96 rest on the upper surface of the apertured plate 74 and cap plate 62 for engagement with the lower surface of screen 50 to effect cleaning of the screen. The screen cleaning elements are vibrated to move randomly against the lower surface of the screen 50 as a result of vibrations imparted to the assembly 56,74,50 etc. by motor-driven vibration means mounted in the central cylindrical housing 60 as will be discussed in detail hereinafter. However, it should be noted at this juncture that each of the screen cleaning elements 96 consists of a generally cylindrical tube having parallel upper and lower surfaces 97 and 98 respectively with a side slot 99 being provided in the tubular member so that the center of gravity of each of the screen cleaning elements 96 is offset with respect to its longitudinal axis. It has been found that this offset center of gravity for the cleaning elements 96 results in substantially improved movement of the elements around the central protrusion 68 as compared with previous cleaner elements of the type not having an offset center of gravity and simply consisting of a tubular piece of polyvinyl chloride. The tubular elements move in a clockwise direction as indicated by arrows 100 in FIG. 4 when the eccentric means is driven in a counterclockwise direction as will be discussed hereinafter. It should be understood that obtaining the offset center of gravity or the cleaning elements could be achieved in other ways such as by the use of different shaped openings, a reduced wall thickness on one side with no opening or by the addition of a weight on the interior of the tubular members, if desired. However, the tubular members should be of generally cylindrical outer configuration with the improved results being achieved because the center of gravity of the tubular members is offset with respect to the axis of the outer cylindrical surface. Also, while polyvinyl chloride is the preferred material for the screen cleaning elements, metal or other material could be employed.

Figure 4:
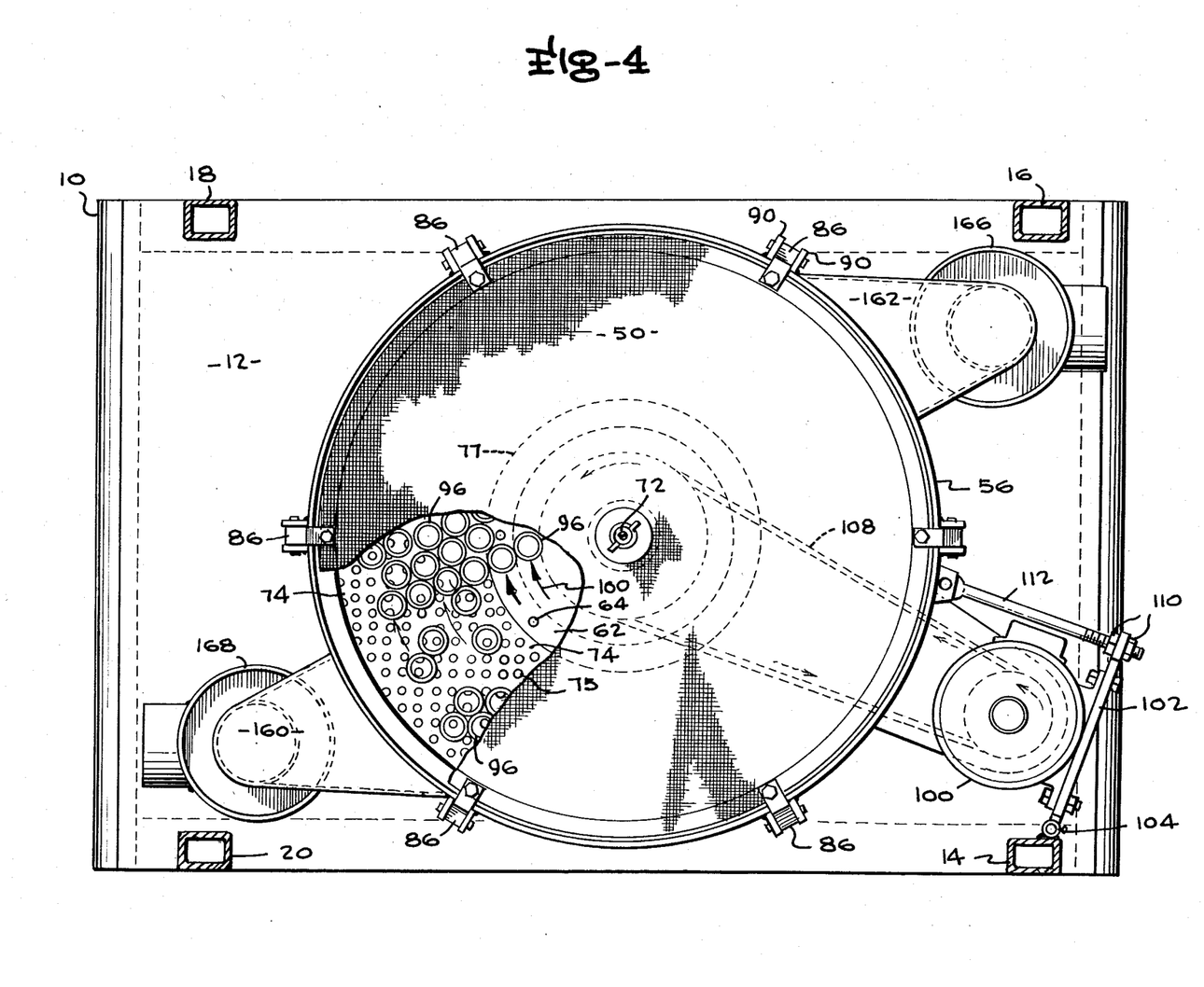
FIG. 4 is a sectional view taken along lines 4—4 of FIG. 2.
Figures 5, 6:
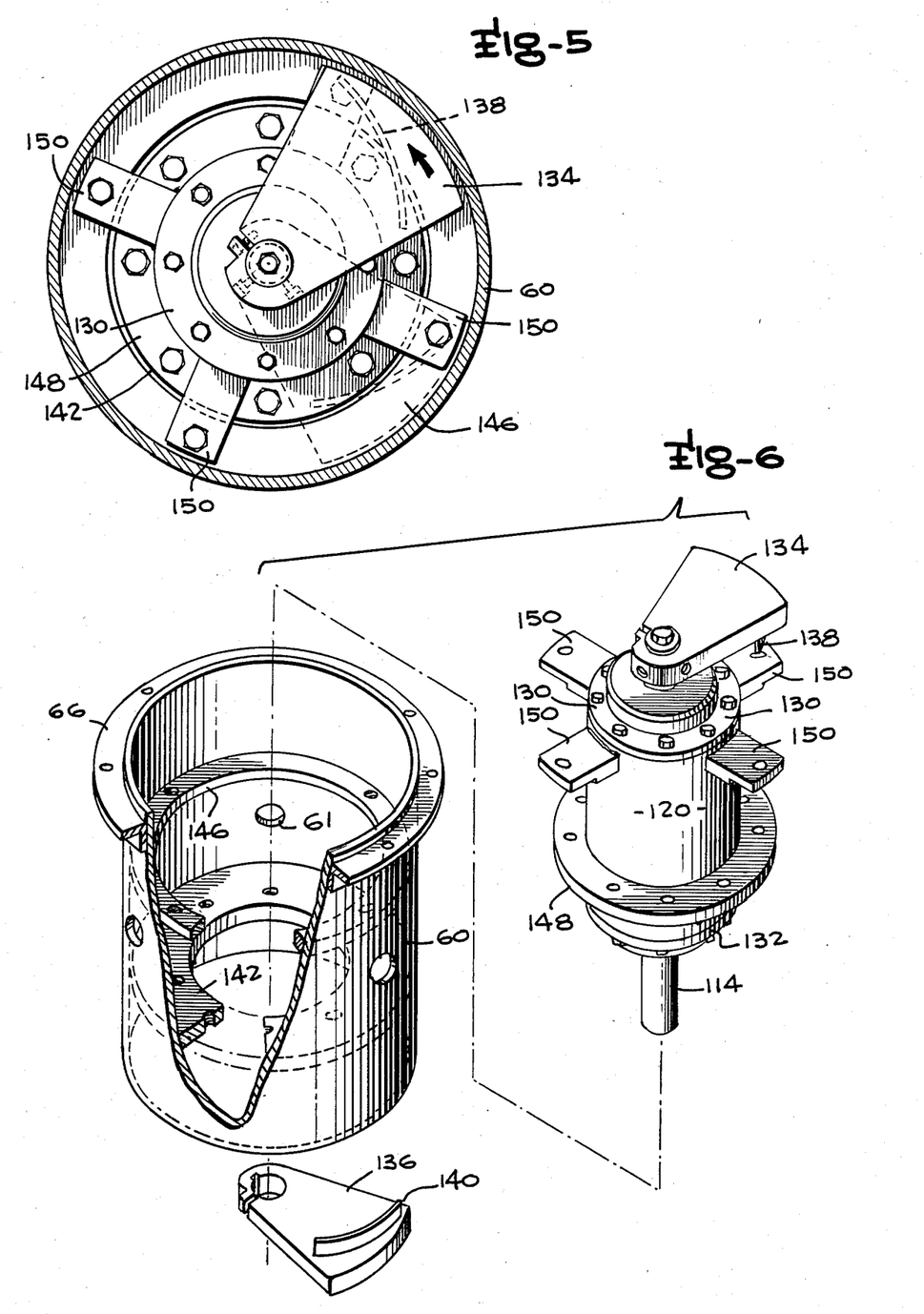
FIG. 5 is a sectional view taken along lines 5—5 of FIG. 3.
FIG. 6 is an exploded perspective view of modular vibration means employed in the preferred embodiment.
Figure 7:
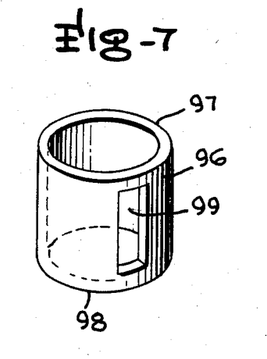
FIG. 7 is a perspective view of an individual screen cleaning element.

Operation is imparted to the floating tub assembly 52 by operation of an electric motor 100 mounted on a support plate 102 pivotally connected at 104 to the vertical corner post member 14 as best shown in FIG. 4. Rotation of motor 100 is in a counterclockwise direction as viewed in FIG. 4 serves to drive a power input sheave 106 by dual belt means 108. Tension in the belt means 108 is adjustable by means of adjustment nuts 110 on a pivotal threaded rod 112 pivotally supported at an opposite end on the outer surface of cylindrical sidewall 56. The power input sheave 106 is keyed on the lower end of a vertical eccentric support shaft 114 supported for rotation by upper and lower bearing means 116 and 118 in a generally cylindrical bearing housing 120 axially positioned within the interior of central cylindrical housing 60. Upper bearing means 116 is positioned between seal means 122 and 124 and lower bearing 118 is similarly positioned between seal means 126 and 128 with the entire shaft, bearing and seal assembly being held in position by retainer members 130 and 132. An upper eccentric weight 134 is clamped on the upper end of eccentric support shaft 114 for rotation therewith and a similar lower eccentric weight 136 is keyed to the lower end of the shaft with the upper weight having a vane 138 facing downwardly and the lower weight having a vane 140 facing upwardly. The upper eccentric weight can be adjustably positioned about the axis of shaft 114 to vary the total amount of vibratory force provided by it and lower weight 136. Vanes 138 and 140 serve to circulate the air in the central cylindrical housing 60 during rotation of the shaft 114 which rotation also provides an effective vibration due to the eccentricity of the weight members 134 and 136. It should be observed that the central cylindrical housing 60 includes a lower internal radial support flange 142 and an upper internal radial support flange 146. The lower radial support flange 142 supports a flange 148 extending outwardly from bearing housing 120 adjacent the lower portion thereof while the upper flange 146 supports four radial support arms 150 extending outwardly from the upper end of bearing housing 120. The arms 150 and the flange 148 are respectively bolted to the internal radial support flanges 146 and 142 as best shown in FIG. 3 so as to provide for a firm and positive connection between the bearing housing 120 and the remaining components of the floating tub assembly 52.

It should be observed that the floating tub assembly 52 includes an upper discharge chute 160 positioned above the screen 50 for discharging the relatively large particles in the mud that are incapable of passage through the screen 50. Additionally, a lower discharge chute 162 is positioned in the cylindrical sidewall 56 to receive the smaller particles and liquid that have passed through the screen 50 and the annular perforated plate 74. The discharge from chute 162 is cascaded into an open topped receiver 166 which is not connected to the chute 162 so as to permit unimpeded vibration of the chute 162 and the other affiliated components of the floating tub assembly 52. Similarly, the discharge from the upper chute 160 is directed into an open topped receiver 168 which is also not connected to the upper chute 160.

In operation, the closure 46 is positioned to block the side discharge conduit 42 and the central discharge aperture 48 is opened by removing the plug 49 so that the discharge from the cyclone separators 34 flows from the central discharge aperture 48 onto the upper surface of the screen 50. Operation of the motor 100 causes the eccentric weights 134 and 136 to be rapidly rotated to effect a vibration of the entire floating tub assembly 52 so as to greatly increase the rate at which the smaller particles and liquid flow through the screen 50 and then downwardly through the openings 75 in apertured plate 74 for discharge through the lower discharge chute 162. Additionally, the vibration imparts a clockwise movement of the screen cleaning elements 96 on plate 74 about the axial protrusion 68 so that the upper surface of the screen cleaning elements 97 engage the lower surface of the screen to dislodge any particles adhering thereto and consequently greatly increase the rate at which materials can pass through the screen. The fact that the screen cleaning elements 96 have their center of gravity offset with respect to their axis causes them to rotate about their own axis while moving across plate 74 and results in a substantial increase in their movement as compared to tubular cleaning elements not having such such an offset center of gravity.

It is well-known that the most common mechanical failure in vibratory separators occurs with the vibrator assembly. The present invention permits the vibrator assembly to be be easily removed as a unit for replacement and/or repair by first removing the screen 50 which is easily achieved by loosening of the clamping members 81 which are pivoted to their external position and then loosening the thumb nut and washer assembly 72 to permit the screen to be lifted upwardly and outwardly from the apparatus. Cap plate 62 is then removed and the lower eccentric weight 136 and the sheave 106 are removed from the lower end of the shaft 114 following which the bolts extending through the radial support lugs 150 and the flange 148 are removed to permit the entire bearing housing 120 to be lifted upwardly and outwardly of the apparatus. The outer diameter of flange 148 is less than the inner diameter of flange 146 so as to permit the flange 148 to move upwardly pass the supporting flange 146. It is consequently an easy matter to effect removal and replacement of the entire vibrator assembly. Moreover, if sheave 106 and eccentric weight 136 are dimensioned so that their outermost diameters are equal to, or less than, the diameter of the bearing housing 120, they need not be removed from shaft 114 prior to removal of the housing 120 upwardly from the housing 60.

Another advantage of the present invention is that the rotation of the upper eccentric weight 134 causes the vane 138 to direct a flow of air in the housing 60 which is facilitated by virtue of the openings 61 in the wall of the housing so as to enhance coolin of the bearing assembly.

Numerous modifications of the preferred embodiment of the present invention will undoubtedly occur to those of skill in the art and is should therefore be understood that the sphere and scope of the invention is to be limited solely by the appended claims.

I claim:

1. In a vibratory separator apparatus of the type including a horizontally extending screen mounted on a vibratory support above a vibratory screen cleaning element supporting surface positioned beneath the screen, the improvement comprising a plurality of screen cleaning elements supported on said supporting surface with each of said screen cleaning elements comprising a single tubular member having a vertical longitudinal axis and a center of gravity offset with respect to its vertical longitudinal axis.

2. The invention of claim 1, wherein said tubular members each comprise a hollow generally cylindrical tube.

3. The invention of claim 2, wherein said hollow generally cylindrical tube has parallel upper and lower ends with an aperture extending through said generally cylindrical tube at a location between said upper and lower ends.

4. The invention of claim 2, wherein said hollow generally cylindrical tubes are formed of polyvinylchloride.

5. A vibratory separator comprising frame means, a vibratory tub assembly mounted on said frame means by supporting spring means, a horizontal screen extending across an upper portion of said vibratory tub assembly, a vertically extending central housing provided axially with respect to said vibratory tub assembly, said central housing having a hollow interior and including support means removably supporting a bearing housing axially within said central housing, a removable cap plate positioned over the upper end of said central housing whereby said bearing housing can be lifted upwardly from said central housing for removal and replacement following removal of said cap plate, an eccentric suport shaft mounted in said bearing housing and extending coaxially with respect thereto, eccentric weights attached to the upper and lower ends of said eccentric support shaft, motor means for imparting rotation to said eccentric support shaft for effecting vibration of said vibratory tub assembly, wherein said vibratory tub assembly includes a cylindrical sidewall having inner and outer surfaces, an annular floor panel connected at its outer periphery to a bottom portion of said cylindrical sidewall, flange means extending inwardly from the inner surface of said cylindrical sidewall adjacent an upper edge portion thereof for supporting the peripheral surface of said screen means, bracket means mounted in said outer surface, clamping means mounted on said bracket means for swinging movement between a first position partially above said flange means and a second position completely external of said cylindrical sidewall so that when in said first position said clamping means is operable for clamping the peripheral surface of the screen to said flange means, an annular perforated plate extending inwardly from the inner surface of said cylindrical sidewall and a plurality of tubular screen cleaning elements each comprising a hollow generally cylindrical tube having a lontitudinal vertical axis and parallel upper and lower ends with an aperture being provided in said tube between said upper and lower ends effecting the positioning of the center of gravity in offset relationship with respect to the longitudinal vertical axis with said lower end resting on said annular perforated plate for support and said upper end lightly engaging the lower surface of said screen means with said screen cleaning elements having a vertical axis and a center of gravity offset with respect to said vertical axis.

6. A vibratory separator comprising frame means, a vibratory tub assembly mounted on said frame means by supporting spring means, a horizontal screen extending across an upper portion of said vibratory tub assembly, a vertically extending central housing of cylindrical configuration provided axially with respect to said vibratory tub assembly, said central housing having a hollow interior and including inwardly extending flange means removably supporting a bearing housing of cylindrical configuration positioned axially within said central housing and including outwardly extending means resting on and removably connected to said inwardly extending flange of said central housing, a removable cap plate positioned over the upper end of said central housing whereby said bearing housing can be lifted upwardly from said central housing for removal and replacement following removal of said cap plate, an eccentric support shaft mounted in said bearing housing and extending coaxially with respect thereto, eccentric weights attached to the upper and lower ends of said eccentric support shaft, motor means for imparting rotation to said eccentric support shaft for effecting vibration of said vibratory tub assembly, wherein said vibratory tub assembly includes a cylindrical sidewall having inner and outer surfaces, an annular floor panel connected at its outer periphery to a bottom portion of said cylindrical sidewall, flange means extending inwardly from the inner surface of said cylindrical sidewall adjacent an upper edge portion thereof for supporting the peripheral surface of said screen means, bracket means mounted in said outer surface, clamping means mounted on said bracket means for a swinging movement between a first position partially above said flange means and a second position completely external of said cylindrical sidewall so that when in said first position said clamping means is operable for clamping the peripheral surface of the screen to said flange means, an annular perforated plate extending inwardly from the inner surface of said cylindrical sidewall, a plurality of tubular screen cleaning elements supported on said annular perforated plate having a lower end resting on said annular perforated plate and an upper end lightly engaging the lower surface of said screen means with said screen cleaning elements having a vertical axis and a center of gravity offset with respect to said vertical axis, and wherein said bracket means comprises first and second parallel spaced bracket plates attached to the outer surface of said cylindrical sidewall and having aligned apertures each consisting of a square upper portion and a larger substantially circular lower portion and said clamping means comprises a swing arm having a threaded rod attached to one end for adjustment toward or away from said screen means when in said first position and a shaft of square cross-section on the opposite end of said swing arm received in the aligned apertures of said bracket plates with said shaft being matingly fittable in said square upper portion of the aperture to preclude rotation of the swing arm or being loosely received in the substantially circular lower portion to permit pivotal movement of the swing arm between the first and second positions.

7. The invention of claim 6, wherein said screen cleaning elements each comprise a hollow generally cylindrical tube.

8. The invention of claim 7, wherein said hollow generally cylindrical tube has parallel upper and lower ends with an aperture being provided between said upper and lower end effecting the positioning of the center of gravity in offset relationship with respect to the longitudinal axis.

9. The invention of claim 7, wherein said hollow generally cylindrical tube is formed of polyvinylchloride.

10. Clamping means comprising bracket means including first and second parallel spaced bracket plates attached to the outer surface of a support member and having aligned apertures each consisting of a square upper portion and a larger lower portion, a shaft of square cross-section extending through said aligned apertures and being matingly positionable in said square upper portions but also being positionable in said larger lower portion so as to be pivotable about its axis when in said larger portion, a swing arm having a first end connected to said shaft of square cross-section, a threaded rod threadedly mounted in an opposite end of said swing arm for transverse movement relative to said swing arm, a swivel-foot mounted on one end of said threaded rod whereby said square shaft can be matingly fitted in said square upper portions of said apertures to preclude rotation of the swing arm when in a first position during a clamping operation effected by rotary movement of the threaded rod or can be loosely received in the substantially larger lower portions of said aperture to permit pivotal movement of the swing arm through at least 180° movement between said first position and a second position.

11. The invention of claim 10, wherein said swing arm is of generally C-shaped configuration.

12. A vibratory separator comprising frame means, a vibratory tub assembly mounted on said frame means by supporting spring means, a horizontal screen extending across an upper portion of said vibratory tub assembly, a vertically extending central housing provided axially with respect to said vibratory tub assembly, said central housing having a hollow interior and including support means removably supporting a module consisting of a bearing housing axially within said central housing, a removable cap plate positioned over the upper end of said central housing whereby said bearing housing can be lifted upwardly from said central housing for removal and replacement following removal of said cap plate, upper and lower bearing means mounted internally of said bearing housing, an eccentric support shaft mounted in said upper and lower bearing means in said bearing housing and extending coaxially with respect thereto, eccentric weights attached to the upper and lower ends of said eccentric support shaft and motor means positioned externally of the central housing for imparting rotation to said eccentric support shaft for effecting vibration of said vibratory tub assembly and wherein said vibratory tub assembly includes a cylindrical sidewall having an inner surface and an outer surface, an annular floor panel connected at its outer periphery to a bottom portion of said cylindrical sidewall, flange means extending inwardly from the inner surface of said cylindrical sidewall adjacent an upper edge portion thereof for supporting the peripheral surface of said horizontal screen means, clamping means for clamping the peripheral surface of the horizontal screen to said flange means, an annular perforated plate extending inwardly from the inner surface of said cylindrical sidewall and a plurality of tubular screen cleaning elements supported on said annular perforated plate having a lower end resting on said annular perforated plate and an upper end lightly engaging the lower surface of said horizontal screen means with said screen cleaning elements having a vertical axis and a center of gravity offset with respect to said vertical axis.

13. A vibratory separator comprising frame means, a vibratory tub assembly mounted on said frame means by supporting spring means, a horizontal screen extending across an upper portion of said vibratory tub assembly, a vertically extending central housing provided axially with respect to said vibratory tub assembly, said central housing having a hollow interior and including support means removably supporting a module consisting of a bearing housing axially within said central housing, a removable cap plate positioned over the upper end of said central housing whereby said bearing housing can be lifted upwardly from said central housing for removal and replacement following removal of said cap plate, upper and lower bearing means mounted internally of said bearing housing, an eccentric support shaft mounted in said upper and lower bearing means in said bearing housing and extending coaxially with respect thereto, eccentric weights attached to the upper and lower ends of said eccentric support shaft and motor means positioned externally of the central housing for imparting rotation to said eccentric support shaft for effecting vibration of said vibratory tub assembly and wherein said vibratory tub assembly includes a cylindrical sidewall having inner and outer surfaces, an annular floor panel connected at its outer periphery to a bottom portion of said cylindrical sidewall, flange means extending inwardly from the inner surface of said cylindrical sidewall adjacent an upper edge portion thereof for supporting the peripheral surface of said horizontal screen means, bracket means mounted on said outer surface, clamping means mounted on said bracket means for swinging pivotal movement about a horizontal axis between a first position partially above said flange means and a second position completely external of the outer surface of said cylindrical sidewall so that when in said first position said clamping means is operable for clamping the peripheral surface of the screen to said flange means, an annular perforated plate extending inwardly from the inner surface of said cylindrical sidewall and a plurality of tubular screen cleaning elements supported on said annular perforated plate having a lower end resting on said annular perforated plate and an upper end lightly engaging the lower surface of said screen means with said screen cleaning elements having a vertical axis and a center of gravity offset with respect to said vertical axis.

14. The invention of claim 13, wherein said bracket means comprises first and second parallel spaced bracket plates attached to the outer surface of said cylindrical sidewall and having aligned apertures each consisting of a square upper portion and a larger substantially circular lower portion and said clamping means comprises a swing arm having a threaded rod attached to one end for adjustment toward or away from said screen means when in said first position and a shaft of square cross-section on the opposite end of said swing arm received in the aligned apertures of said bracket plates with said shaft being matingly fittable in said square upper portion of the aperture to preclude rotation of the swing arm during a clamping operation or being loosely received in the substantially circular lower portion to permit pivotal movement of the swing arm between the first and second positions.

15. The invention of claim 13, wherein said screen cleaning elements each comprise a hollow generally cylindrical tube.

16. The invention of claim 15, wherein said hollow generally cylindrical tube is formed of polyvinylchloride.

17. A vibratory separator comprising frame means, a vibratory tub assembly mounted on said frame means by supporting spring means, a horizontal screen extending across an upper portion of said vibratory tub assembly, a vertically extending central housing provided axially with respect to said vibratory tub assembly, said central housing having a hollow interior and including support means removable supporting module consisting of a bearing housing axially within said central housing, a removable cap plate positioned over the upper end of said central housing whereby said bearing housing can be lifted upwardly from said central housing for removal and replacement following removal of said cap plate, upper and lower bearing means mounted internally of said bearing housing, an eccentric support shaft mounted in said upper and lower bearing means in said bearing housing and extending coaxially with respect thereto, eccentric weights attached to the upper and lower ends of said eccentric support shaft and motor means positioned externally of the central housing for imparting rotation to said eccentric support shaft and motor means positioned externally of the central housing for imparting rotation to said eccentric support shaft for effecting vibration of said vibratory tub assembly and wherein vertically extending central housing is of cylindrical configuration and includes inwardly extending internal flange means for providing support for said bearing housing, said bearing housing is of cylindrical configuration and has outwardly extending arm means resting on an removably connected to said inwardly extending flange means of said central houing, said vibratory tub assembly includes a cylindrical sidewall having an inner surface and an outer surface, an annular floor panel connected at its outer periphery to a bottom portion of said cylindrical sidewall, flange means extending inwardly from the inner surface of said cylindrical sidewall adjacent an upper edge portion thereof for supporting the peripheral surface of said screen means, clamping means for clamping the peripheral surface of the screen to said flange means, an annular perforated plate extending inwardly from the inner surface of said cylindrical sidewall and a plurality of tubular screen cleaning elements supported on said annular perforated plate having a lower end resting on said annular perforated plate and an upper end lightly engaging the lower surface of said screen means with said screen cleaning elements having a vertical axis and a center of gravity offset with respect to said vertical axis.

18. A vibratory separator comprising frame means, a vibratory tub assembly mounted on said frame means by supporting spring means, a horizontal screen extending across an upper portion of said vibratory tub assembly, a vertically extending central housing provided axially with respect to said vibratory tub assembly, said central housing having a hollow interior and including support means removably supporting a module consisting of a bearing housing axially within said central housing, a removable cap plate positioned over the upper end of said central housing whereby said bearing housing can be lifted upwardly from said central housing for removal and replacement following removal of said cap plate, upper and lower bearing means mounted internally of said bearing housing, an eccentric support shaft mounted in said upper and lower bearing means in said bearing housing and extending coaxially with respect thereto, eccentric weights attached to the upper and lower ends of said eccentric support shaft and motor means positioned externally of the central housing for imparting rotation to said eccentric support shaft for effecting vibration of said vibratory tub assembly and wherein said vertically extending central housing is of cylindrical configuration and includes inwardly extending internal flange means for providing support for said bearing housing, said bearing housing is of cylindrical configuration and has outwardly extending arm means resting on and removably connected to said inwardly extending flange means of said central housing, said vibratory tub assembly includes a cylindrical sidewall having inner and outer surfaces, an annular floor panel connected at its outer periphery to a bottom portion of said cylindrical sidewall, flange means extending inwardly from the inner surface of said cylindrical sidewall adjacent an upper edge portion thereof for supporting the peripheral surface of said screen means, bracket means mounted in said outer surface, clamping means mounted on said bracket means for swinging between a first position partially above said flange means and a second position completely external of said cylindrical sidewall so that when in said first position said clamping means is operable for clamping the peripheral surface of the screen to said flange means, an annular perforated plate extending inwardly from the inner surface of said cylindrical sidewall, a plurality of tubular screen cleaning elements supported on said annular perforated plate having a lower end resting on said annular perforated plate and an upper end lightly engaging the lower surface of said screen means with said screen cleaning elements having a vertical axis and a center of gravity offset with respect to said vertical axis.

* * * * *